US010963755B2

(12) United States Patent
Takagi et al.

(10) Patent No.: US 10,963,755 B2
(45) Date of Patent: Mar. 30, 2021

(54) INTERFERENCE IDENTIFICATION DEVICE AND INTERFERENCE IDENTIFICATION METHOD

(71) Applicant: Mitsubishi Electric Corporation, Tokyo (JP)

(72) Inventors: Manabu Takagi, Tokyo (JP); Kazumasa Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 126 days.

(21) Appl. No.: 16/321,698

(22) PCT Filed: Sep. 20, 2016

(86) PCT No.: PCT/JP2016/077694

§ 371 (c)(1),
(2) Date: Jan. 29, 2019

(87) PCT Pub. No.: WO2018/055673

PCT Pub. Date: Mar. 29, 2018

(65) Prior Publication Data

US 2020/0380314 A1 Dec. 3, 2020

(51) Int. Cl.

*H04L 1/00* (2006.01)
*G06K 9/62* (2006.01)
*H04B 17/345* (2015.01)

(52) U.S. Cl.

CPC ......... *G06K 9/6272* (2013.01); *G06K 9/6218* (2013.01); *G06K 9/6228* (2013.01); *H04B 17/345* (2015.01)

(58) Field of Classification Search

CPC ..... H04L 27/2647; H04L 4/06; H04B 1/1027; H04B 1/123; H04W 24/08; H04W 24/04

(Continued)

(56) References Cited

U.S. PATENT DOCUMENTS

2012/0021710 A1 1/2012 Tsukamoto et al.
2014/0079103 A1* 3/2014 Currivan ............... H04L 5/0062 375/222

(Continued)

FOREIGN PATENT DOCUMENTS

| | | | |
|---|---|---|---|
| JP | 5793961 | B2 | 10/2015 |
| JP | 5942804 | B2 | 6/2016 |
| WO | WO 2016/035439 | A1 | 3/2016 |

OTHER PUBLICATIONS

Takagi et al., "Analysis of Measurement Data on Electromagnetic Environments using Nonhierarchical Clustering Algorithm", The Institute of Electronics, Information and Communication Engineers, Proceedings of the 2015 Society Conference of IEICE 1, Aug. 25, 2015, B-5-102, p. 364 (Total No. pp. 4).

(Continued)

*Primary Examiner* — Khai Tran
(74) *Attorney, Agent, or Firm* — Birch, Stewart, Kolasch & Birch, LLP.

(57) ABSTRACT

An interference identification device according to the present invention includes a feature calculation unit that calculates, using an electromagnetic wave received during a sample data analysis length, at least one type of feature of the electromagnetic wave, an interference identification unit that identifies a cluster to which the at least one type of feature belongs, among a plurality of clusters, each of the plurality of clusters having a region defined in a cluster space in which one type of feature corresponds to one dimension, and a sample data analysis length update unit that updates the sample data analysis length based on a distance, in the cluster space, between the at least one type of feature and the cluster.

13 Claims, 8 Drawing Sheets

(58) Field of Classification Search
USPC .......................................................... 375/346
See application file for complete search history.

(56) References Cited

U.S. PATENT DOCUMENTS

2015/0230111 A1* 8/2015 Wang ...................... H04W 4/06
370/252
2017/0295581 A1 10/2017 Takagi

OTHER PUBLICATIONS

Takagi et al., "The analysis of Measurement Data on Electromagnetic Environments based on Interference power distribution", The Institute of Electronics, Information and Communication Engineers, Proceedings of the 2015 IEICE General Conference 1, Feb. 24, 2015, B-5-124, p. 479 (Total No. pp. 4).

* cited by examiner

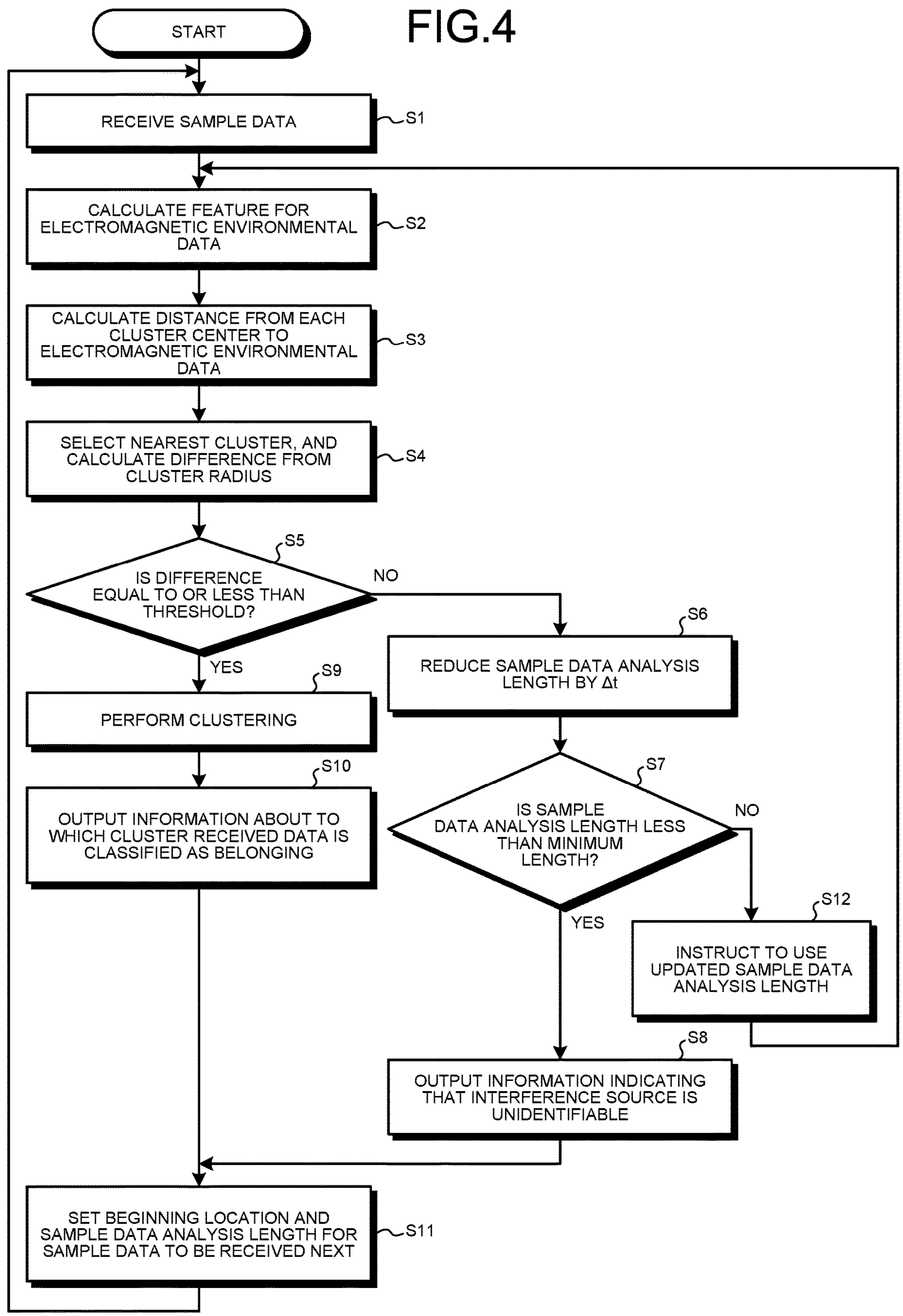
FIG.4
START
RECEIVE SAMPLE DATA
S1
CALCULATE FEATURE FOR ELECTROMAGNETIC ENVIRONMENTAL DATA
S2
CALCULATE DISTANCE FROM EACH CLUSTER CENTER TO ELECTROMAGNETIC ENVIRONMENTAL DATA
S3
SELECT NEAREST CLUSTER, AND CALCULATE DIFFERENCE FROM CLUSTER RADIUS
S4
S5
IS DIFFERENCE EQUAL TO OR LESS THAN THRESHOLD?
NO
YES
S6
REDUCE SAMPLE DATA ANALYSIS LENGTH BY Δt
S9
PERFORM CLUSTERING
S10
OUTPUT INFORMATION ABOUT TO WHICH CLUSTER RECEIVED DATA IS CLASSIFIED AS BELONGING
S7
IS SAMPLE DATA ANALYSIS LENGTH LESS THAN MINIMUM LENGTH?
NO
YES
S12
INSTRUCT TO USE UPDATED SAMPLE DATA ANALYSIS LENGTH
S8
OUTPUT INFORMATION INDICATING THAT INTERFERENCE SOURCE IS UNIDENTIFIABLE
SET BEGINNING LOCATION AND SAMPLE DATA ANALYSIS LENGTH FOR SAMPLE DATA TO BE RECEIVED NEXT
S11

10a
1
2
RF PROCESSING UNIT
3
A/D CONVERTER UNIT
4
FEATURE CALCULATION UNIT
5
DISTANCE-TO-CLUSTER CALCULATION UNIT
6
SAMPLE DATA ANALYSIS LENGTH UPDATE UNIT
7
INTERFERENCE IDENTIFICATION UNIT
11
SAMPLE DATA DISCARD UNIT
8
MEMORY UNIT
9
OUTPUT UNIT

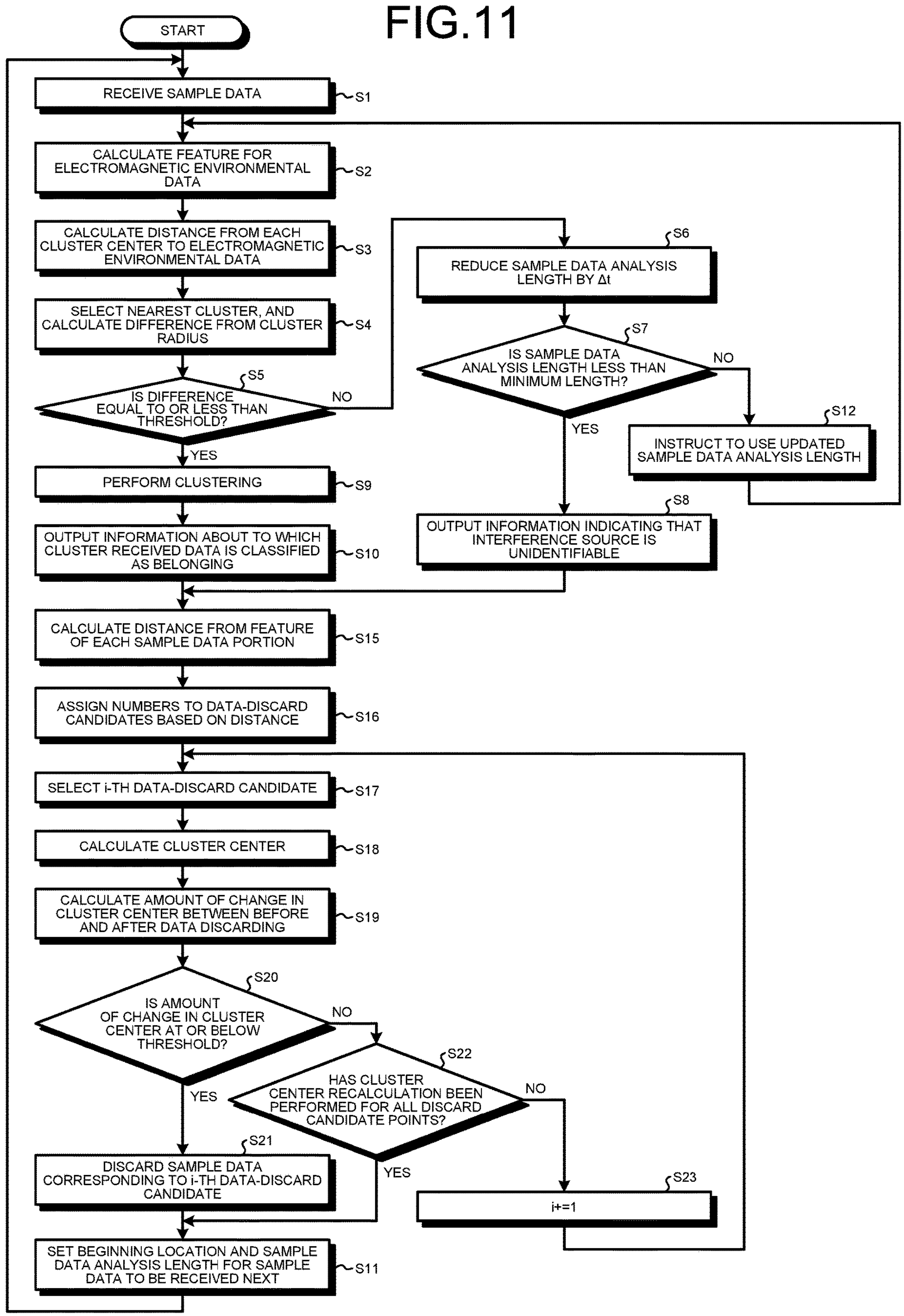
FIG.11
START
RECEIVE SAMPLE DATA
S1
CALCULATE FEATURE FOR ELECTROMAGNETIC ENVIRONMENTAL DATA
S2
CALCULATE DISTANCE FROM EACH CLUSTER CENTER TO ELECTROMAGNETIC ENVIRONMENTAL DATA
S3
SELECT NEAREST CLUSTER, AND CALCULATE DIFFERENCE FROM CLUSTER RADIUS
S4
IS DIFFERENCE EQUAL TO OR LESS THAN THRESHOLD?
S5
NO
YES
REDUCE SAMPLE DATA ANALYSIS LENGTH BY Δt
S6
IS SAMPLE DATA ANALYSIS LENGTH LESS THAN MINIMUM LENGTH?
S7
NO
YES
INSTRUCT TO USE UPDATED SAMPLE DATA ANALYSIS LENGTH
S12
PERFORM CLUSTERING
S9
OUTPUT INFORMATION INDICATING THAT INTERFERENCE SOURCE IS UNIDENTIFIABLE
S8
OUTPUT INFORMATION ABOUT TO WHICH CLUSTER RECEIVED DATA IS CLASSIFIED AS BELONGING
S10
CALCULATE DISTANCE FROM FEATURE OF EACH SAMPLE DATA PORTION
S15
ASSIGN NUMBERS TO DATA-DISCARD CANDIDATES BASED ON DISTANCE
S16
SELECT i-TH DATA-DISCARD CANDIDATE
S17
CALCULATE CLUSTER CENTER
S18
CALCULATE AMOUNT OF CHANGE IN CLUSTER CENTER BETWEEN BEFORE AND AFTER DATA DISCARDING
S19
IS AMOUNT OF CHANGE IN CLUSTER CENTER AT OR BELOW THRESHOLD?
S20
NO
YES
HAS CLUSTER CENTER RECALCULATION BEEN PERFORMED FOR ALL DISCARD CANDIDATE POINTS?
S22
NO
YES
DISCARD SAMPLE DATA CORRESPONDING TO i-TH DATA-DISCARD CANDIDATE
S21
i+=1
S23
SET BEGINNING LOCATION AND SAMPLE DATA ANALYSIS LENGTH FOR SAMPLE DATA TO BE RECEIVED NEXT
S11

INTERFERENCE IDENTIFICATION DEVICE AND INTERFERENCE IDENTIFICATION METHOD

FIELD

The present invention relates to an interference identification device and an interference identification method, each for identification of the type of an interference signal.

BACKGROUND

With rapid development of wireless communication in recent years, shortage on the number of available frequencies is becoming a serious problem. Therefore, introduction of a new communication system may suffer from unavailability of dedicated frequencies. If no such dedicated frequencies are available, a communication system may be constructed using the industry science medical (ISM) band. Due to being a frequency band reserved for industrial, scientific, and medical devices for general purposes, the ISM band may be used by various kinds of devices. Accordingly, a communication system constructed using the ISM band may suffer from interference with wireless transmission caused by an interference signal, which may then cause a communication error. In the ISM band, various kinds of devices may act as a source of an interference signal, i.e., an interference source. An interference signal has characteristics specific to the communication protocol of each device and/or other factors. Thus, to identify the cause of a communication error, technologies for extracting a feature of an interference signal have been suggested.

Patent Literature 1 discloses a device that samples an electromagnetic wave at fixed intervals, calculates a feature, such as amplitude probability distribution, from a waveform sample, which is a result of sampling, stores the feature, calculates a similarity between multiple features stored, and thus classifies waveform samples into clusters based on the similarity.

CITATION LIST

Patent Literature

Patent Literature 1: Japanese Patent No. 5793961

SUMMARY

Technical Problem

The foregoing technology described in Patent Literature 1 classifies multiple waveform samples, including previous to latest waveform samples, into clusters based on similarity between waveform samples. Thus, the technology described in Patent Literature 1 enables classification by interference sources if the electromagnetic environment does not change, that is, the interference sources do not change. However, when the communication device is moving, an interference signal received by a communication device, i.e., the electromagnetic environment of a communication device included in a communication system, changes at every moment. Thus, in a case in which the electromagnetic environment changes at every moment, the interference source may change over time in such a manner that the interference source sampled at a certain time differs from an interference source sampled at another time during sampling at fixed intervals. In such case, interference signal classification using the foregoing technology described in Patent Literature 1 may fail to provide correct classification into clusters.

The present invention has been made in view of the foregoing, and it is an object of the present invention to provide an interference identification device and an interference identification method, each capable of appropriately classifying an interference signal regardless of whether or not the electromagnetic environment has changed.

Solution to Problem

An interference identification device according to an aspect of the present invention includes a feature calculation unit that calculates, using an electromagnetic wave received during an analysis time length, at least one type of feature of the electromagnetic wave, and an identification unit to identify a cluster to which the at least one type of feature belongs, among a plurality of clusters, each of the multiple clusters having a region defined in a cluster space having one or more dimensions in which one type of feature corresponds to one dimension; and an update unit to update the analysis time length based on a distance, in the cluster space, between the at least one type of feature and one of the clusters to which the at least one type of feature belongs.

Advantageous Effects of Invention

An interference identification device according to the present invention provides an advantage in being capable of appropriately classifying an interference signal regardless of whether or not the electromagnetic environment has changed.

BRIEF DESCRIPTION OF DRAWINGS

FIG. 4 is a flowchart illustrating an example of the flow of a process performed by the feature calculation unit, the distance-to-cluster calculation unit, the sample data analysis length update unit, and the interference identification unit of the first embodiment.

FIG. 11 is a flowchart illustrating an example of the flow of a process performed by the feature calculation unit, the distance-to-cluster calculation unit, the sample data analysis length update unit, the interference identification unit, and the sample data discard unit of the second embodiment.

DESCRIPTION OF EMBODIMENTS

An interference identification device and an interference identification method according to embodiments of the present invention will be described in detail below with reference to the drawings. Note that these embodiments are not intended to limit the scope of this invention.

First Embodiment

Figure 1:
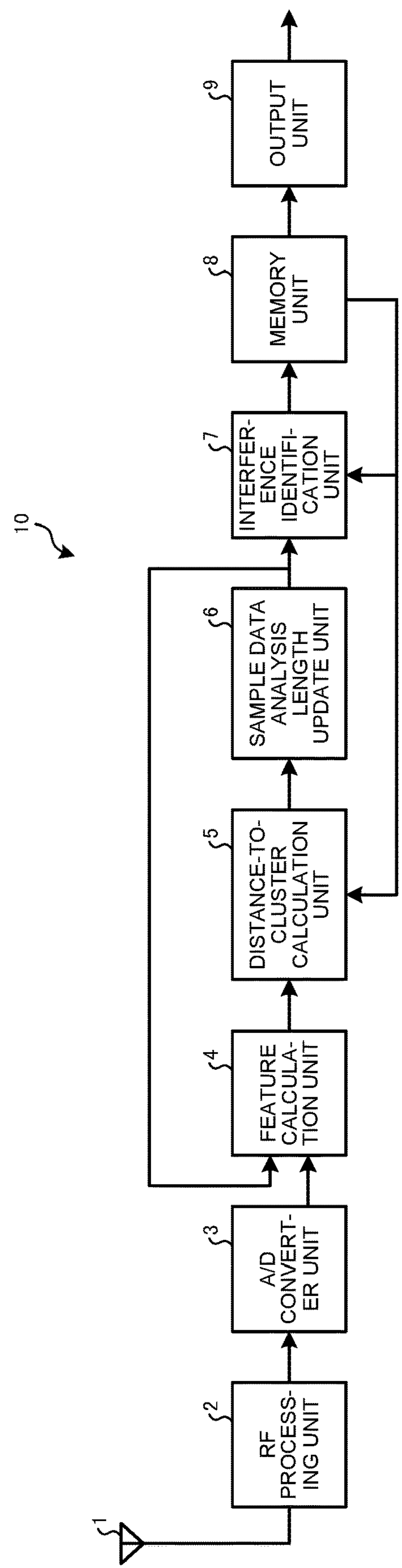
FIG. 1 is a diagram illustrating a functional configuration of an interference identification device according to a first embodiment.

FIG. 1 is a diagram illustrating a functional configuration of an interference identification device according to a first embodiment of the present invention. An interference identification device 10 of the present embodiment receives electromagnetic environmental data, and identifies the type of an interference signal contained in the electromagnetic environmental data, based on a feature of the electromagnetic environmental data. As used herein, the term "electromagnetic environmental data" refers to measurement data obtained by the interference identification device 10 by measuring an electromagnetic wave received, as described later. The interference identification device 10 may be incorporated in a communication device.

As illustrated in FIG. 1, the interference identification device 10 of the present embodiment includes an antenna 1, a radio frequency (RF) processing unit 2, an analog-to-digital (A/D) converter unit 3, a feature calculation unit 4, a distance-to-cluster calculation unit 5, a sample data analysis length update unit (hereinafter referred to simply as "analysis length update unit") 6, an interference identification unit 7, a memory unit 8, and an output unit 9.

The antenna 1 receives an electromagnetic wave. The antenna 1 is desirably an antenna capable of receiving an electromagnetic wave effectively. Specifically, the antenna 1 is, for example, a high-gain antenna, and is more specifically a directional antenna such as a Yagi-Uda antenna, or a dual-polarized antenna capable of receiving horizontally and vertically polarized electromagnetic waves at the same time to receive an electromagnetic wave regardless of the polarity of the interference wave. It is also assumed herein that the antenna 1 can receive electromagnetic waves each having multiple frequencies. The RF processing unit 2 is a reception processing unit that amplifies the electromagnetic wave received by the antenna 1. More specifically, the RF processing unit 2 performs processing such as amplification of the electromagnetic wave received by the antenna 1 and filtering for removing a noise in the electromagnetic wave received, measures the electromagnetic wave processed, and outputs the measurement result as measurement data. The measurements performed by the antenna 1 and by the RF processing unit 2 are, specifically, for example, measurement of the intensity of the electromagnetic wave received by the antenna 1 for each frequency. Although the description below will be provided using an example of measurement of the intensity of an electromagnetic wave for each frequency, the quantity to be measured is not limited to the quantity as described in this example, but may be appropriately determined depending on which types are to be used for classification of an interference signal, that is, depending on a feature to be extracted. The A/D converter unit 3 is a circuit that converts analog data output from the RF processing unit 2, i.e., measurement data, into digital data sampled every certain period of time, and outputs the digital data. In the present embodiment, measurement data that has been converted into digital data is also referred to as "electromagnetic environmental data".

The feature calculation unit 4 uses the electromagnetic wave, i.e., the electromagnetic environmental data, received during a sample data analysis length to calculate at least one type of feature of that electromagnetic wave. More specifically, the feature calculation unit 4 uses the digital data in an amount corresponding to a predetermined sample data analysis length or a sample data analysis length notified of by the analysis length update unit 6 to calculate a feature that represents a characteristic of the electromagnetic wave received. The sample data analysis length, which is an analysis time length, is expressed in units of time. The sample data analysis length defines the length of digital data for use in one feature calculation, in terms of the time duration for receiving the digital data. That is, a sample data analysis length of one second means that digital data received in one second is used for one feature calculation.

The distance-to-cluster calculation unit 5 is a distance calculation unit that selects a cluster that corresponds to the shortest distance of multiple distances, and then calculates a difference by subtraction of the cluster radius of the selected cluster from the distance of the selected cluster. The multiple distances are each a distance, calculated for each of multiple clusters, between a feature calculated by the feature calculation unit 4, and the cluster center (described later) of that cluster.

The analysis length update unit 6 is an update unit that updates the sample data analysis length based on the distance, in a cluster space, between the feature calculated by the feature calculation unit 4 and the cluster. More specifically, the analysis length update unit 6 updates the sample data analysis length based on the difference calculated by the distance-to-cluster calculation unit 5. Further specifically, the analysis length update unit 6 checks whether the difference between the distance to the cluster calculated by the distance-to-cluster calculation unit 5 and the cluster radius described later herein is less than or equal to a threshold, and updates the sample data analysis length and instructs the feature calculation unit 4 to use the updated sample data analysis length if the difference is greater than the threshold.

The interference identification unit 7 is an identification unit that identifies the cluster to which the at least one type of feature calculated by the feature calculation unit 4 belongs, among the multiple clusters. Each of the multiple clusters has a region defined in the cluster space in which one feature corresponds to one dimension. More specifically, the interference identification unit 7 identifies the type of an interference signal contained in the electromagnetic environmental data by clustering the electromagnetic environmental data, that is, by classifying the electromagnetic environmental data into clusters, based on the feature calculated by the feature calculation unit 4. As used in the present embodiment, a cluster refers to a group corresponding to the type of an interference signal. A more specific description of cluster will be provided later herein. The memory unit 8 stores, in association with one another, the result of identification (identification result) of the electromagnetic environmental data, the feature calculated using the sample data analysis length set by the analysis length update unit 6, and the sample data analysis length. The output unit 9 outputs the result of identification of the type of the interference signal obtained by the interference identification unit 7.

Figure 2:
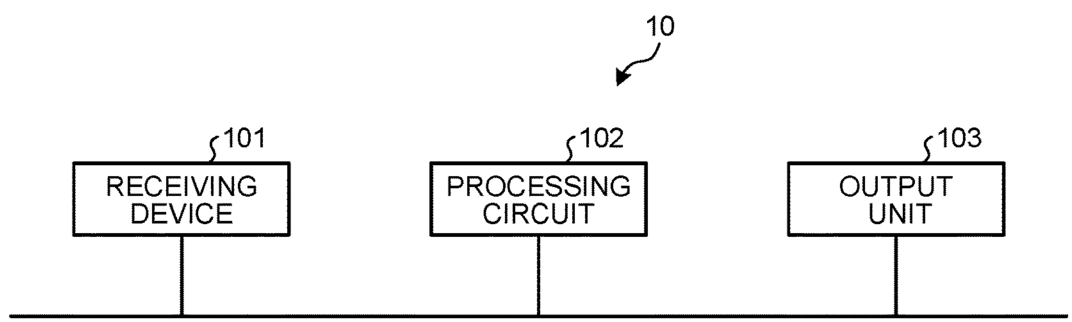
FIG. 2 is a diagram illustrating an example hardware configuration of the interference identification device of the first embodiment.

An example hardware configuration of the interference identification device 10 of the present embodiment will next be described. FIG. 2 is a diagram illustrating an example hardware configuration of the interference identification device 10. In the example hardware configuration illustrated in FIG. 2, the feature calculation unit 4, the distance-to-cluster calculation unit 5, the analysis length update unit 6, the interference identification unit 7, and the memory unit 8 illustrated in FIG. 1 are implemented in a processing circuit 102. The processing circuit 102 is formed of a circuit, such as, for example, an application specific integrated circuit (ASIC) or a field-programmable gate array (FPGA), and a memory, or a combination thereof. The feature calculation unit 4, the distance-to-cluster calculation unit 5, the analysis length update unit 6, the interference identification unit 7, and the memory unit 8 may be separately implemented in individual processing circuits, or may together be implemented in one processing circuit. The receiving device 101 is a receiver that implements the antenna 1, the RF processing unit 2, and the A/D converter unit 3 illustrated in FIG. 1. The output unit 103 is, for example, a display, a monitor, or a printer, and implements the output unit 9 illustrated in FIG. 1. The processing circuit may be a dedicated circuit, or may be a control circuit using a processor.

Figure 3:
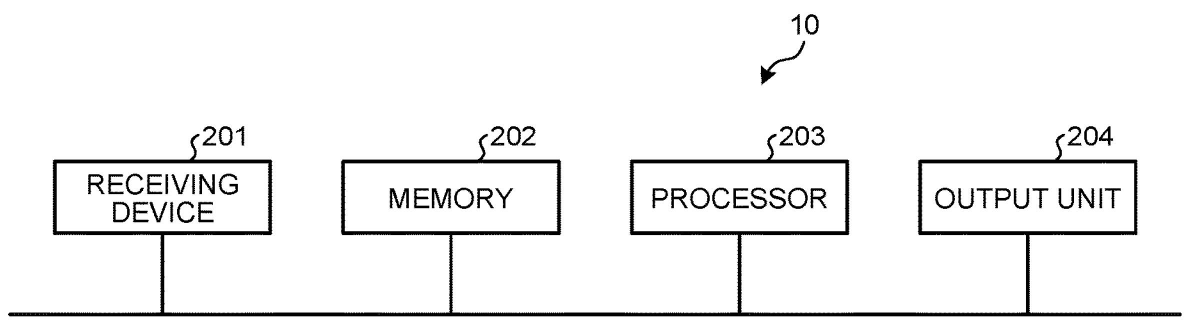
FIG. 3 is a diagram illustrating another example of the hardware configuration of the interference identification device of the first embodiment.

FIG. 3 is a diagram illustrating another example of the hardware configuration of the interference identification device 10. The example hardware configuration illustrated in FIG. 3 illustrates an example configuration in which the feature calculation unit 4, the distance-to-cluster calculation unit 5, the analysis length update unit 6, and the interference identification unit 7 illustrated in FIG. 1 are implemented in software. In this case, the feature calculation unit 4, the distance-to-cluster calculation unit 5, the analysis length update unit 6, and the interference identification unit 7 are implemented by the processor 203 reading and executing a program stored in a memory 202 illustrated in FIG. 3. The memory unit 8 is implemented in the memory 202. The receiving device 201 is a receiver that implements the antenna 1, the RF processing unit 2, and the A/D converter unit 3 illustrated in FIG. 1. The output unit 204 is, for example, a display, a monitor, or a printer, and implements the output unit 9 illustrated in FIG. 1. The memory 202 is also used by the processor 203 to perform operations.

The processor 203 illustrated in FIG. 3 is a processing circuit, such as a central processing unit (CPU), that performs an operation. The memory 202 is a non-volatile or volatile semiconductor memory, such as a random access memory (RAM), a read-only memory (ROM), a flash memory, an erasable programmable read-only memory (EPROM), an electrically erasable programmable read-only memory (EEPROM); a magnetic disk; or the like.

The feature calculation unit 4, the distance-to-cluster calculation unit 5, the analysis length update unit 6, and the interference identification unit 7 may be configured such that a part thereof is implemented in a dedicated circuit, and the rest is implemented in software.

An operation of the interference identification device 10 of the present embodiment will next be described. The interference identification device 10 of the present embodiment appropriately sets the sample data analysis length for electromagnetic environmental data, and thus identifies the type of an interference signal contained in the electromagnetic environmental data with high accuracy.

At the beginning, the interference identification device 10 receives an electromagnetic wave using the antenna 1, and performs processing such as amplification and filtering on the received electromagnetic wave, using the RF processing unit 2. Next, the A/D converter unit 3 performs A/D conversion on measurement data output from the RF processing unit 2, and outputs digital data, i.e., electromagnetic environmental data, that has been converted from the analog data. This electromagnetic environmental data also contains identification information for use in identifying the electromagnetic environmental data. Examples of the identification information for use in identifying the electromagnetic environmental data include at least one of: the time of reception of the electromagnetic environmental data, the time of process of the electromagnetic environmental data performed by the A/D converter unit 3, and the location of reception of the electromagnetic environmental data; but the identification information is not limited thereto. In a case in which the location of reception of the electromagnetic environmental data is used as the identification information, the interference identification device 10 includes, for example, a global positioning system (GPS) function for calculation of the location thereof based on the data received from a GPS satellite.

The feature calculation unit 4 calculates a feature of the electromagnetic environmental data using the electromagnetic environmental data, and outputs the calculated feature to the distance-to-cluster calculation unit 5 together with the identification information. In other words, the feature calculation unit 4 extracts the feature from the electromagnetic environmental data. Specifically, the feature calculation unit 4 calculates a feature that represents a characteristic of the electromagnetic wave received, using the electromagnetic environmental data in an amount corresponding to a predetermined sample data analysis length if no instruction is dispatched from the analysis length update unit 6 on the sample data analysis length, that is, if the feature calculation unit 4 is in an initial state. The feature calculation unit 4 holds the electromagnetic environmental data that has been used in analysis, for at least a certain time period. In response to instructions on the beginning position of the electromagnetic environmental data for use in analysis of the feature and on the sample data analysis length from the analysis length update unit 6, the feature calculation unit 4 calculates the feature based on these instructions.

A feature has a value that depends on the type of the interference signal. Examples of the feature include an average power, a dispersion calculated from a power value histogram, a skewness, i.e., a third-order moment, and a kurtosis, i.e., a fourth-order moment. Specifically, the feature calculation unit 4 calculates two types of features using the electromagnetic environmental data. For example, the feature calculation unit 4 calculates an average power and a skewness using the electromagnetic environmental data. Although the present embodiment is described using an example that uses two types of features to identify the type of an interference signal, any appropriate feature(s) may be calculated to identify the type of an interference signal. Thus, either three or more types of features or one type of feature may be calculated.

The distance-to-cluster calculation unit 5 performs mapping of a pair of features calculated by the feature calculation unit 4 into a cluster space. A cluster space used in the present embodiment is a space having one or more dimensions. In the space, one dimension corresponds to one type of feature. If m types of features are used, the cluster space is an m-dimension space, where m is an integer greater than or equal to one. Thus, the mapping operation into a cluster space is equivalent to, for example, expressing each piece of electromagnetic environmental data by a set of coordinate values in the m-dimension space. A cluster used in the present embodiment is a group corresponding to the type of an interference signal. A cluster is defined by own center of the cluster in the cluster space, i.e., the cluster center, and own radius of the cluster in the cluster space, i.e., the cluster radius. That is, each region of each of the multiple clusters in the cluster space is defined by the cluster center, which is the center of each of the multiple clusters, and by the cluster radius, which is the radius of each of the multiple clusters.

Next, the distance-to-cluster calculation unit 5 calculates, for each cluster, a distance between the calculated feature and that cluster. Specifically, the distance-to-cluster calculation unit 5 calculates the distance between the feature and the cluster center as the distance between the feature and the cluster. The distance-to-cluster calculation unit 5 calculates the distance between the feature calculated by the feature calculation unit 4 and the cluster center of each cluster, and then selects the cluster that provides the shortest calculated distance. A distance used herein may be a Euclidean distance, a Mahalanobis distance, or a Chebyshev distance.

Next, the distance-to-cluster calculation unit 5 calculates a difference between the distance between the cluster center of the selected cluster and the feature calculated by the feature calculation unit 4, and the cluster radius of the selected cluster. The distance-to-cluster calculation unit 5 then outputs the difference calculated, to the analysis length update unit 6 together with the feature calculated by the feature calculation unit 4 and the identification information. Note that this difference is calculated by subtraction of the cluster radius of the selected cluster, from the distance between the cluster center of the selected cluster and the feature calculated by the feature calculation unit 4. Accordingly, when a cluster radius of the selected cluster is greater than the distance between the cluster center of the selected cluster and the feature calculated by the feature calculation unit 4, the difference has a negative value.

The initial value of the cluster center of each cluster may be predetermined based on the type of an interference signal to be classified, or may be calculated using the result of classification of each feature, i.e., the feature of each piece of electromagnetic environmental data, as belonging to a certain cluster. In the latter case, the distance-to-cluster calculation unit 5 calculates the initial value of the cluster center, for example, as follows. The distance-to-cluster calculation unit 5 calculates, for each of k features, distances between a feature and other features, and determines a pair of features most distant from each other. Here, k is an integer greater than or equal to two, but since k is the number used for the initial classification as described later, the value of k is preferably greater than twice the number of the clusters to be defined. Distances between each of the pair of features most distant from each other and k-2 features are calculated, and these features are each classified as belonging to the nearest cluster therefrom. After completion of the classification of all the features into two clusters, the cluster center is calculated using Equation (1) below. In the equation, $C_i$ represents a set of features contained in the cluster i, and $|C_i|$ represents the number of features contained in that cluster. The operation is repeated from the step of classifying the k-2 features into the clusters to the step of calculating the coordinates of the cluster center, until the calculation of the cluster center results in no more change in the coordinates of the cluster center, or a change in the coordinates falls below a threshold. When recalculation of the cluster center results in no more change in the coordinates of the cluster center, or a change in the coordinates falls below a threshold, that coordinate set in the cluster space is determined as the initial value of the cluster center.

[Formula 1]

$$C_i = \frac{1}{|C_i|} \sum_{X_j \in C_i} X_j \tag{1}$$

The initial value of the cluster radius of each cluster may be predetermined based on the type of an interference signal to be classified, or may be calculated from the k features described above. The distance-to-cluster calculation unit 5 calculates the cluster center of each cluster as described above, and calculates the distance from the cluster center of each clusterto each of the k features described above. The distance-to-cluster calculation unit 5 classifies each of the k features as belonging to the cluster having the cluster center least distant from that feature. Then, the distance-to-cluster calculation unit 5 calculates, for each cluster, the distance between the cluster center and the feature classified as belonging to that cluster, multiplies the longest distance of the distances calculated, by ½, and defines the product R as the radius of that cluster. Alternatively, a value calculated by adding a constant value to R, or a value calculated by multiplying R by a constant ratio, may be determined as the cluster radius.

Note that the initial values of the cluster center and of the cluster radius described above may be calculated by the interference identification unit 7 or by another component not illustrated in FIG. 1, instead of by the distance-to-cluster calculation unit 5.

The analysis length update unit 6 determines whether the difference output from the distance-to-cluster calculation unit 5 is less than or equal to a threshold. Note that the threshold is assumed to be a positive value. Therefore, if a difference output from the distance-to-cluster calculation unit 5 is a negative value, the difference is less than the threshold. If the difference output from the distance-to-cluster calculation unit 5 is greater than the threshold, the analysis length update unit 6 reduces the current sample data analysis length by a predetermined time length $\Delta t$, and instructs the feature calculation unit 4 to use the updated sample data analysis length. As described above, the feature calculation unit 4 instructed to use the updated sample data analysis length then recalculates the feature using the electromagnetic environmental data in an amount corresponding to the updated sample data analysis length. If the difference output from the distance-to-cluster calculation unit 5 is less than or equal to the threshold, the analysis length update unit 6 does not update the sample data analysis length, that is, provides no instructions to the feature calculation unit 4. In this case, the analysis length update unit 6 outputs the feature calculated by the feature calculation unit 4 to the interference identification unit 7 together with the sample data analysis length that has been used for calculation of that feature, and the identification information corresponding to that feature.

The interference identification unit 7 calculates the distance between the feature calculated by the feature calculation unit 4 and the cluster center of each cluster. The interference identification unit 7 selects the cluster that provides the shortest calculated distance, and assigns that feature to the selected cluster. The interference identification unit 7 associates the sample data analysis length; the identification information corresponding to that feature, i.e., the identification information of the electromagnetic environmental data corresponding to that feature; and information indicating the selected cluster, with one another, and then stores this set of information in the memory unit 8 as the identification result. The information indicating the cluster may be, for example, the number associated with the cluster, i.e., the cluster number.

The output unit 9 outputs the identification result stored in the memory unit 8. The method of outputting the identification result by the output unit 9 is not particularly limited. The output unit 9 may output, for example, the identification result corresponding to the latest feature, i.e., the cluster number. Or, the output unit 9 outputs the identification result corresponding to the latest feature, i.e., the cluster number, together with the sample data analysis length. Alternatively, the output unit 9 may output the identification information and the identification result of each feature in association with one another, with respect to multiple features. Although this example assumes that the identification result is first stored in the memory unit 8, and is then later output to the output unit 9, the identification result may be directly output from the interference identification unit 7 to the output unit 9 without being stored in the memory unit 8.

The flow of a process performed by the feature calculation unit 4, the distance-to-cluster calculation unit 5, the analysis length update unit 6, and the interference identification unit 7 of the present embodiment will next be described. FIG. 4 is a flowchart illustrating an example of the flow of a process performed by the feature calculation unit 4, the distance-to-cluster calculation unit 5, the analysis length update unit 6, and the interference identification unit 7 of the present embodiment.

At the beginning, the feature calculation unit 4 receives electromagnetic environmental data in an amount corresponding to the sample data analysis length, i.e., sample data, from the A/D converter unit 3 (step S1). The feature calculation unit 4 may receive the sample data such that the A/D converter unit 3 holds digital data until the amount of the electromagnetic environmental data held therein reaches the amount corresponding to the sample data analysis length, at which time the A/D converter unit 3 inputs the electromagnetic environmental data into the feature calculation unit 4. Alternatively, the feature calculation unit 4 may receive the sample data described above such that the A/D converter unit 3 sequentially inputs pieces of the electromagnetic environmental data into the feature calculation unit 4, and when the input amount of the electromagnetic environmental data reaches the amount corresponding to the sample data analysis length, the feature calculation unit 4 determines completion of the input, i.e., completion of the reception.

The feature calculation unit 4 calculates a feature with respect to the electromagnetic environmental data (step S2). Specifically, the feature calculation unit 4 calculates at least one type of feature as described above using the sample data, i.e., the electromagnetic environmental data in an amount corresponding to the sample data analysis length.

The distance-to-cluster calculation unit 5 calculates the distance between the cluster center of each cluster and the feature calculated by the feature calculation unit 4 (step S3). Note that, before performing step S3, the distance-to-cluster calculation unit 5 calculates the cluster radius and the cluster center of each cluster by the method described above using the feature(s) stored in the memory unit 8. The cluster radii and the cluster centers may be calculated at any time after step S1 and before performing step S3. The cluster radii and the cluster centers calculated are stored in the memory unit 8.

Next, the distance-to-cluster calculation unit 5 selects the nearest cluster, that is, the cluster that corresponds to the shortest distance between the feature calculated by the feature calculation unit 4 and the cluster center, and calculates the difference between the distance between the cluster center of the selected cluster and the feature calculated by the feature calculation unit 4, and the cluster radius of the selected cluster (step S4).

The analysis length update unit 6 determines whether the difference calculated by the distance-to-cluster calculation unit 5 is less than or equal to a threshold (step S5). If the difference calculated by the distance-to-cluster calculation unit 5 is greater than the threshold (No at step S5), the analysis length update unit 6 reduces the current sample data analysis length by Δt (step S6), and determines whether the current reduced sample data analysis length is less than a minimum length (step S7). As used herein, the term "minimum length" refers to the lowest length that can be set as the sample data analysis length. The minimum length of the sample data analysis length may be set depending on the feature calculation method, or set to a fixed value regardless of the feature.

If the reduced sample data analysis length is less than the minimum length (Yes at step S7), the analysis length update unit 6 outputs, to the interference identification unit 7, information indicating that the type of the interference signal in the electromagnetic environmental data to be processed is unidentifiable (step S8), and the process proceeds to step S11. In response to the output of the information indicating that the type of the interference signal is unidentifiable at step S8, the interference identification unit 7 stores, in the memory unit 8, the information indicating that the type of the interference signal is unidentifiable, together with the identification information of the corresponding feature. Based on the identification information stored in the memory unit 8 and on the information indicating that the type of the interference signal is unidentifiable, the output unit 9 outputs information indicating that the type of the interference signal is unidentifiable for the electromagnetic environmental data corresponding to that identification information.

Otherwise, if the reduced sample data analysis length is greater than or equal to the minimum length (No at step S7), the analysis length update unit 6 instructs the feature calculation unit 4 to use the updated sample data analysis length, i.e., the reduced sample data analysis length, together with the beginning position of the sample data (step S12). The beginning position of the sample data notified of at this step is the same as the beginning position of the sample data before updating of the sample data analysis length. Then, the process is repeated from step S2.

If, at step S5, the difference calculated by the distance-to-cluster calculation unit 5 is less than or equal to the threshold (Yes at step S5), clustering is performed (step S9). Specifically, the analysis length update unit 6 outputs the feature calculated by the feature calculation unit 4 to the interference identification unit 7, together with the sample data analysis length used for calculation of that feature and the identification information corresponding to that feature. The interference identification unit 7 calculates the distance between the feature calculated by the feature calculation unit 4 and the cluster center of each cluster, selects the cluster that provides the shortest calculated distance, and assigns the feature to the selected cluster, thus to perform clustering.

After step S9, the result of the clustering, i.e., the identification result, is output from the output unit 9 (step S10). Specifically, the interference identification unit 7 stores the identification result in the memory unit 8, and the output unit 9 then reads the identification result from the memory unit 8, and outputs the identification result. The interference identification unit 7 also stores the feature into the memory unit 8 as described above.

Then, the analysis length update unit 6 sets the beginning position and the sample data analysis length of the next sample data (step S11). Specifically, the analysis length update unit 6 determines the beginning position and the sample data analysis length of the next sample data, and instructs the feature calculation unit 4 to use the beginning position of the sample data and the sample data analysis length determined. The beginning position of the next sample data is typically the location next to the end of the sample data that has just been processed, but is not limited thereto. The sample data analysis length of the next sample data may be, for example, the predetermined initial value, or the latest sample data analysis length that has been set for the current process. After step S11, the process is repeated from step S1.

As described above, the interference identification method performed by the interference identification device 10 includes a first step of calculating a feature using an electromagnetic wave received during a sample data analysis length, and a second step of identifying a cluster to which the feature belongs, among multiple clusters. The interference area-specific method further includes a third step of updating the sample data analysis length based on the distances between the feature and the clusters in a cluster space.

Figure 5:
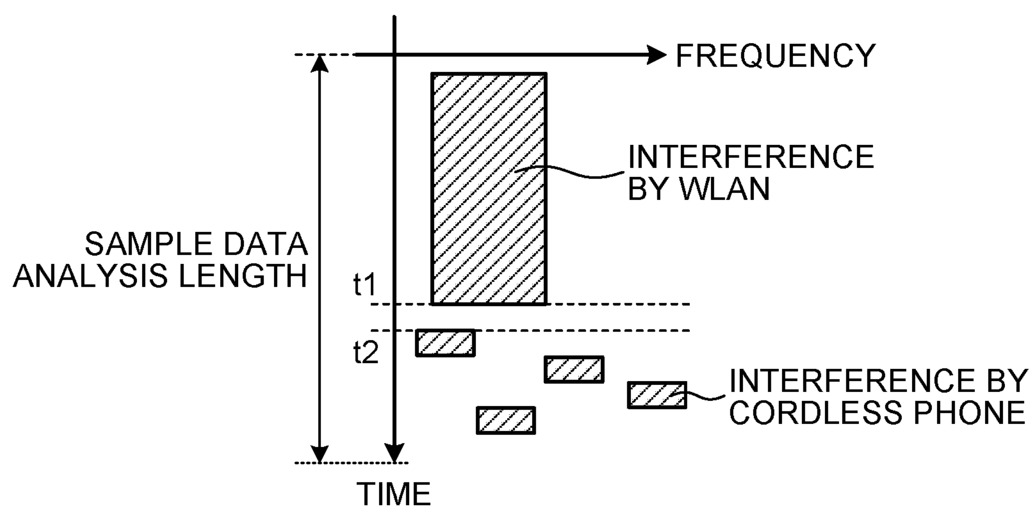
FIG. 5 is a diagram illustrating an example of characteristics, in frequency and time domains, of interference signals received by the interference identification device of the first embodiment.

A specific example of the result of identification of the type of an interference signal in the electromagnetic environmental data, i.e., the result of identification of the type of an interference source, will next be described with reference to FIGS. 5 to 9. FIG. 5 is a diagram illustrating an example of characteristics, in frequency and time domains, of interference signals received by the interference identification device 10. FIG. 5 indicates, by hatching, an area of presence of an interference signal in frequency and time domains when a wireless local area network (WLAN) communication system and a cordless phone are present and each serve as an interference source. In FIG. 5, the horizontal axis represents the frequency, and the vertical axis represents the time. In the example illustrated in FIG. 5, the interference identification device 10 receives an interference signal caused by the WLAN system until time t1, and an interference signal caused by the cordless phone from time t2 which is a time after time t1, during one sample data analysis length. The interference signal caused by the cordless phone has a frequency varying over time. The time period continuously occupied is shorter than the time period occupied by the interference signal caused by the WLAN system. The interference signal caused by the WLAN system has an occupancy in the frequency and time domains higher than the occupancy of the interference signal caused by the cordless phone.

This example further assumes that the feature calculation unit 4 calculates two types of features: skewness and average power. The skewness is herein referred to as feature #1, and the average power is herein referred to as feature #2. Skewness is a kind of high-order moment, and corresponds to a third-order moment. Specifically, the feature calculation unit 4 sorts power values into bins each having a predetermined range thus to form a histogram. Then, a moment about the average value is calculated using the histogram, and the moment calculated is then divided by the cube of the standard deviation to calculate the third-order moment. This example assumes that feature #1, i.e., the skewness, is higher for the interference signal of the cordless phone than for the interference signal caused by the WLAN system; and that the value of feature #2 is lower for the interference signal of the cordless phone than for the interference signal caused by the WLAN system. If the electromagnetic environmental data for use in one feature calculation, i.e., the sample data, contains both of the interference signals, feature #1 and feature #2 each take a value between a value for the interference signal of the cordless phone and a value for the interference signal caused by the WLAN system.

Figure 6:
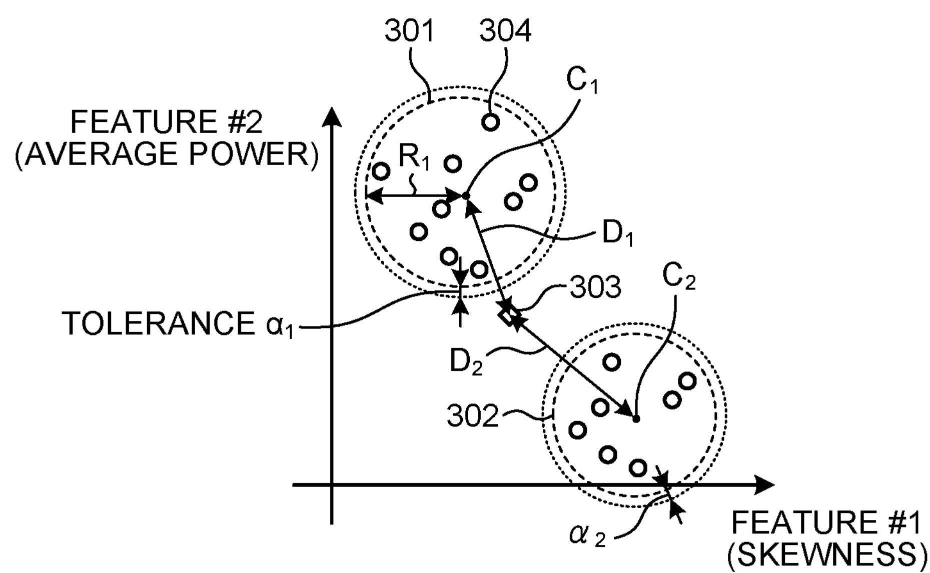
FIG. 6 is a diagram illustrating an example of features mapped into a cluster space in the first embodiment.

FIG. 6 is a diagram illustrating an example of the features mapped into a cluster space. FIG. 6 illustrates an example result of mapping of the features into a cluster space after the interference identification device 10 of the present embodiment calculates the features using sample data corresponding to the sample data analysis length illustrated in FIG. 5 in an environment in which an interference signal caused by the WLAN system and an interference signal caused by the cordless phone are both received. In the example illustrated in FIG. 6, clustering has previously been performed before the features are calculated using the sample data in the sample data analysis length illustrated in FIG. 5, and the features previously calculated are stored in the memory unit 8. FIG. 6 illustrates a point 303 indicated by a rhombus. The point 303 indicates a newly calculated set of features. That is, the point 303 is a point where a set of features are mapped into a cluster space calculated using the sample data in the sample data analysis length illustrated in FIG. 5. FIG. 6 also illustrates a point 304 indicated by an open circle. The point 304 is a point where the set of features is mapped into a cluster space and indicates a piece of data stored in the memory unit 8, i.e., a previously calculated feature. Note that FIG. 6 does not illustrate all the open circles using reference characters, but each open circle without a reference character also indicates a point representing a previously calculated feature mapped into the cluster space.

The cluster 301 illustrated in FIG. 6 corresponds to an interference signal caused by the WLAN system, while the cluster 302 corresponds to an interference signal caused by the cordless phone. The cluster 301 has a cluster center $C_1$ and a cluster radius $R_1$, and the cluster 302 has a cluster center $C_2$. The cluster center and the cluster radius of each cluster are calculated based on previously calculated features as described above. As illustrated in FIG. 6, mapping of features stored in the memory unit 8 results in classification of these features into two clusters: the cluster 301 and the cluster 302.

Figure 7:
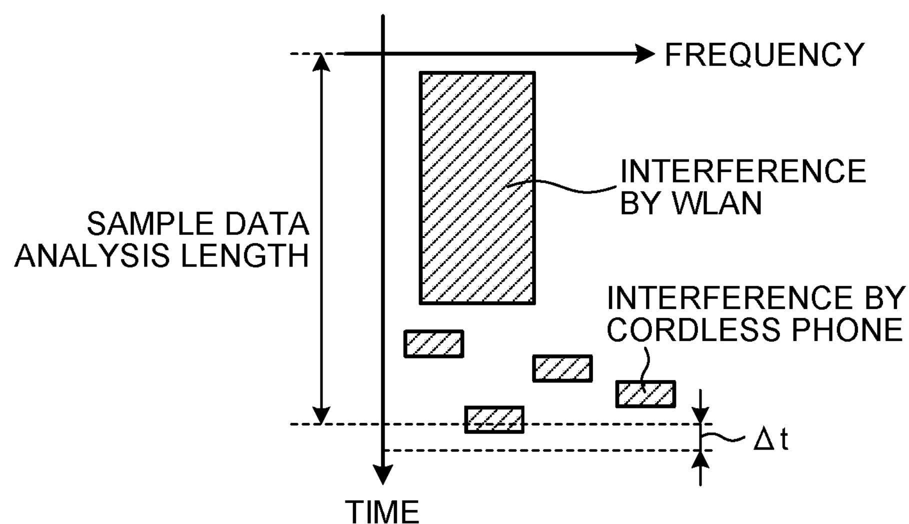
FIG. 7 is a diagram illustrating a sample data analysis length reduced by Δt with respect to the sample data analysis length illustrated in FIG. 5.

The interference identification device 10 calculates a set of features using the sample data in the sample data analysis length illustrated in FIG. 5, and then calculates a distance $D_1$ between that set of features and the cluster center $C_1$ of the cluster 301, and a distance $D_2$ between that set of features and the cluster center $C_2$ of the cluster 302. Then, the interference identification device 10 makes a comparison between the distance $D_1$ and the distance $D_2$, and selects the shorter distance therefrom. It is assumed herein that the distance $D_1$ is less than the distance $D_2$, thereby causing the distance $D_1$ to be selected. As illustrated in FIG. 6, if the difference between the distance D1 and the cluster radius R1 is greater than a tolerance $\alpha_1$, which is a threshold, the interference identification device 10 reduces the sample data analysis length by Δt, and recalculates the features. Note that FIG. 6 illustrates the tolerance for the cluster 301 as $\alpha_1$, and the tolerance for the cluster 302 as $\alpha_2$. However, the tolerance, i.e., the threshold, may be set for each cluster, or alternatively, the tolerance, i.e., the threshold, may be common between the clusters. FIG. 7 is a diagram illustrating a sample data analysis length reduced by $\Delta t$ with respect to the sample data analysis length illustrated in FIG. 5.

Generally, updating of the sample data analysis length changes the shape of the power value histogram, thereby requiring the interference identification device 10 to calculate again the feature #1 and the feature #2. However, recalculation may be omitted for a feature that is not changed by a reduction in the sample data analysis length by $\Delta t$.

Then, similarly again, the interference identification device 10 calculates the distance $D_1$ and the distance $D_2$, calculates a difference between the shorter distance of the distance $D_1$ and the distance $D_2$ and the cluster radius of the cluster corresponding to that distance, and if the difference is greater than the threshold $\alpha_1$, reduces again the sample data analysis length by $\Delta t$ for recalculation. The above process is repeated until the difference reaches or falls below the threshold $\alpha_1$, and when the difference reaches or falls below the threshold $\alpha_1$, the interference identification device 10 no more updates the sample data analysis length, and assigns the set of features to the cluster 301.

Figure 8:
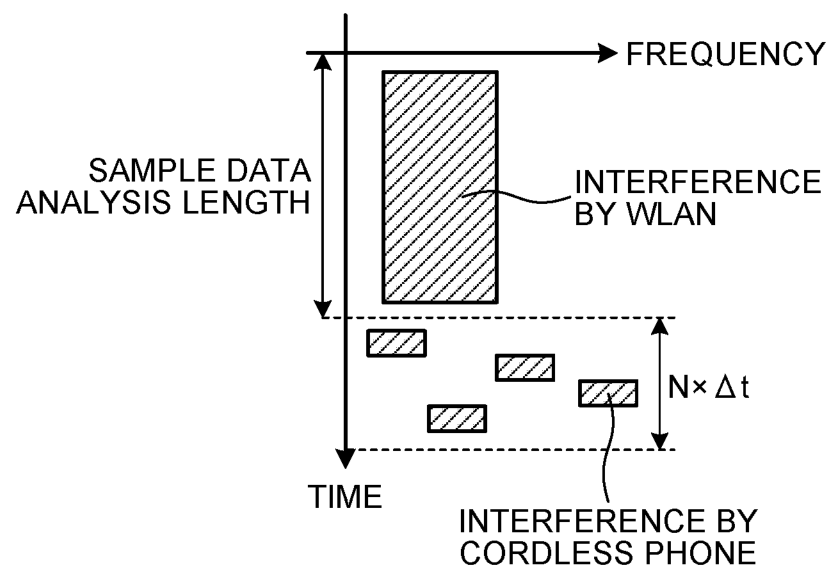
FIG. 8 is a diagram illustrating a sample data analysis length after updating of the sample data analysis length N times starting with the sample data analysis length illustrated in FIG. 5.

FIG. 8 is a diagram illustrating a sample data analysis length after updating of the sample data analysis length N times starting with the sample data analysis length illustrated in FIG. 5. N is an integer greater than or equal to one. Iteration of updating of the sample data analysis length N times reduces the initial sample data analysis length by N×Åt. In the example illustrated in FIG. 8, the time period during which the interference signal caused by the cordless phone is present lies within the time period of N×Åt, which is the reduced amount of the sample data analysis length. This means that the sample data in the sample data analysis length that has been reduced by N×Åt exhibits a characteristic of the interference signal caused by the WLAN system. Thus, a set of features calculated from the sample data in the sample data analysis length that has been reduced by N×Åt leads to a difference between the distance $D_1$ from the cluster center $C_1$ of the cluster 301 to the set of features, and the cluster radius $R_1$ less than or equal to the threshold $\alpha_1$. Thus, that set of features is classified as belonging to the cluster 301.

Figure 9:
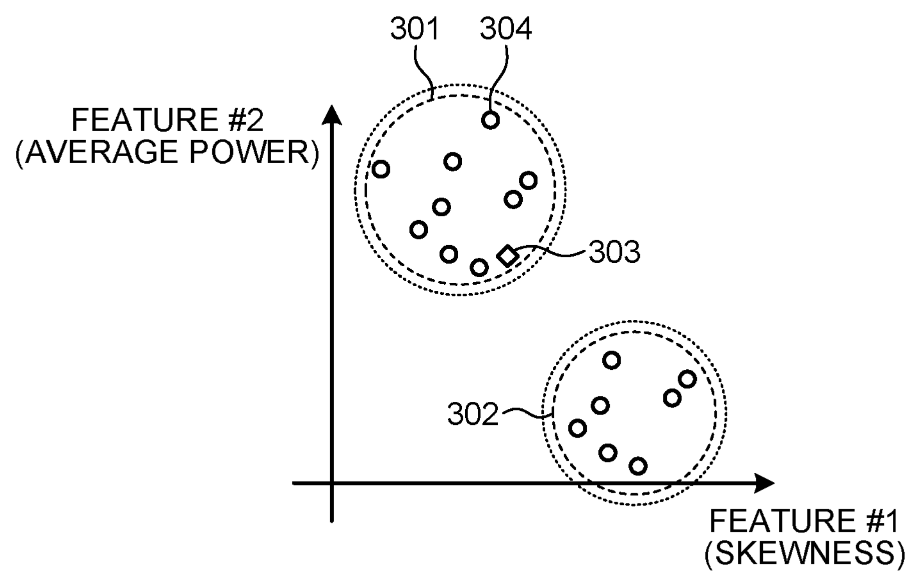
FIG. 9 is a diagram illustrating features calculated using the sample data analysis length illustrated in FIG. 8, mapped into the cluster space.

FIG. 9 is a diagram illustrating sets of features calculated using the sample data analysis length illustrated in FIG. 8, mapped into the cluster space. As illustrated in FIG. 9, it can be seen, in this case, that the newly calculated set of features lies within the cluster 301.

As described above, the interference identification device 10 of the present embodiment is configured to calculate a feature that represents a characteristic of an interference signal, from electromagnetic environmental data, and to update a sample data analysis length based on a distance between the calculated feature and a cluster, specifically, based on a difference between a distance between the feature and the cluster center, and the cluster radius. Thus, even if the interference source changes, an appropriate feature can be calculated by appropriate setting of the sample data analysis length, and thus an interference signal can be classified with high accuracy. In addition, use of a feature calculated using an inappropriate sample data analysis length is avoided in calculation of the cluster radius, thereby preventing the cluster radius from exceeding an appropriate cluster radius. Accordingly, an interference signal can be classified with high accuracy also in performing clustering, i.e., classification of the interference signal, after cluster radius calculation.

Second Embodiment

Figure 10:
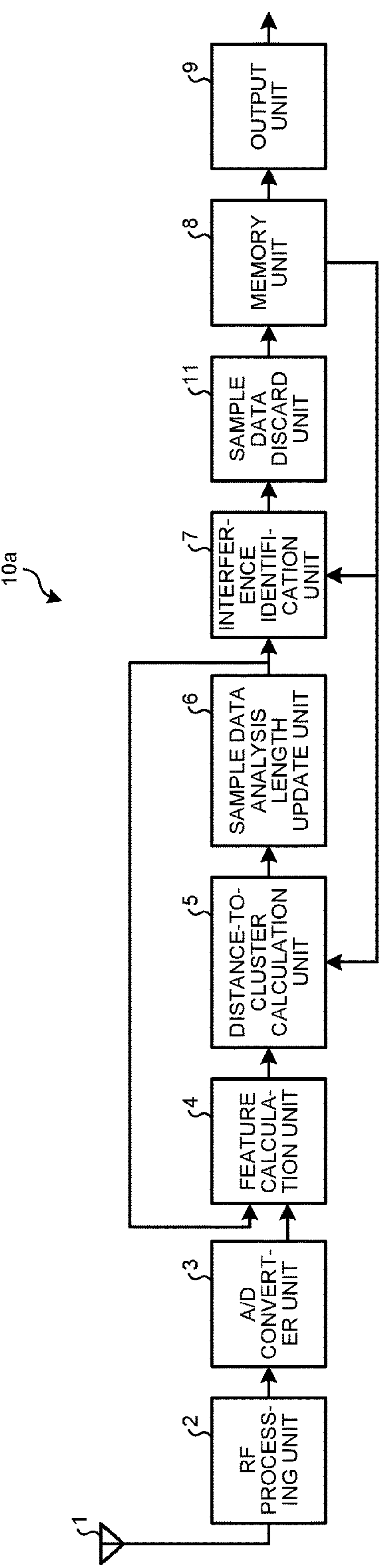
FIG. 10 is a diagram illustrating an example functional configuration of an interference identification device according to a second embodiment.

FIG. 10 is a diagram illustrating an example functional configuration of an interference identification device 10*a* according to a second embodiment of the present invention. The interference identification device 10*a* of the present embodiment has a functional configuration similar to the functional configuration of the interference identification device 10 of the first embodiment except that a sample data discard unit 11 is added to the interference identification device of the first embodiment. Elements having functions similar to the functions of the first embodiment are designated by like reference characters as the first embodiment, and duplicate description will be omitted. The difference from the first embodiment will be described below.

The interference identification device 10*a* of the present embodiment has a hardware configuration similar to the hardware configuration of the interference identification device 10 of the first embodiment. The sample data discard unit 11 is implemented in a processing circuit. Similarly to the distance-to-cluster calculation unit 5, to the analysis length update unit 6, and to the interference identification unit 7, the sample data discard unit 11 may be implemented in a dedicated hardware element or in software.

The interference identification device 10 of the first embodiment calculates a feature of electromagnetic environmental data, and sets the sample data analysis length based on the distance between the feature and a cluster thereby to identity the type of an interference signal with high accuracy. In the first embodiment, the feature for use in identification of the type of the interference signal is stored in the memory unit 8, and a cluster center and a cluster radius are calculated using the feature stored in the memory unit 8. The present embodiment will be described for a method for identifying the type of an interference signal quickly and with high accuracy by discarding data unnecessary for clustering to reduce the amount of the sample. As used herein, the term "sample data" refers to, as described above, electromagnetic environmental data for which one feature calculation is performed. Note that the phrase "to discard sample data" or a similar phrase hereinafter means, in a practical sense, to delete, i.e., to discard, the data of the feature corresponding to that sample data stored in the memory unit 8.

The sample data discard unit 11, which is the discard unit of the present embodiment, calculates the distance in the cluster space between a feature newly calculated by the feature calculation unit 4, i.e., a first feature, and a previously calculated feature belonging to the cluster to which the first feature belongs, i.e., a second feature. Then, the sample data discard unit 11 selects the second feature to be discarded based on the distance calculated, and deletes the selected second feature from the memory unit 8. That is, the sample data discard unit 11 determines which portion of the sample data (sample data portion) is to be discarded, based on the identification results and the features output from the interference identification unit 7, and deletes, from the memory unit 8, the data of the feature corresponding to the sample data portion determined as being to be discarded. Thus, the sample data portion is discarded. A candidate sample data portion to be discarded is a sample data portion relating to the cluster to which the feature calculated by the feature calculation unit 4 belongs, and is a candidate to be discarded in ascending order of the distance from the feature calculated by the feature calculation unit 4. In addition, if the cluster center change by an amount less than or equal to a threshold between before and after discarding of the sample data portion, the sample data portion is discarded. That is, if the distance between the cluster center calculated with a selected second feature and the cluster center calculated without that selected second feature is less than or equal to a threshold for the cluster to which the first feature belongs, the sample data discard unit 11 deletes that selected second feature from the memory unit 8.

An operation of the interference identification device 10*a* of the present embodiment will next be described. FIG. 11 is a flowchart illustrating an example of the flow of a process performed by the feature calculation unit 4, the distance-to-cluster calculation unit 5, the analysis length update unit 6, the interference identification unit 7, and the sample data discard unit 11 of the second embodiment. Description of the part of the operation similar to the corresponding part of the operation of the first embodiment will be omitted. The rest part of the operation in the present embodiment not described below is similar to the corresponding part of the operation of the first embodiment. The process from step S1 to step S12 is performed similarly to the first embodiment.

After step S10, the sample data discard unit 11 calculates distances between features each corresponding to the sample data portions each selected as a data-discard candidate, and the feature calculated by the feature calculation unit 4 (step S15). The sample data discard unit 11 then assigns numbers to the data-discard candidates based on the calculated distances, and initializes a parameter i to 1 (step S16). Specifically, the sample data discard unit 11 assigns numbers to the sample data portions in ascending order of the calculated distance beginning with 1. The parameter i is a parameter representing the number of sample data portion for the discard determination process thereafter.

The sample data discard unit 11 selects an i-th sample data portion among the data-discard candidates (step S17), and calculates the cluster center (step S18). Specifically, at step S18, the sample data discard unit 11 defines the cluster center, which is calculated using features corresponding to the sample data portions including the i-th sample data portion among the clusters corresponding to the features belonging to the data-discard candidates, as the cluster center before discarding. In addition, the sample data discard unit 11 defines the cluster center, which is calculated using features corresponding to the sample data portions without the i-th candidate sample data portion among the clusters corresponding to the data-discard candidates, as the cluster center after discarding.

Next, the sample data discard unit 11 calculates the amount of change in the cluster center between before and after discarding of the data portion, that is, the absolute value of the difference between the cluster center after discarding and the cluster center before discarding (step S19). Next, the sample data discard unit 11 determines whether the amount of change calculated at step S19 is less than or equal to a threshold (step S20). If the amount of change calculated at step S19 is less than or equal to the threshold (Yes at step S20), the sample data discard unit 11 deletes from the memory unit 8, and thus discards, the feature corresponding to the i-th candidate sample data portion (step S21). The process then proceeds to step S11.

If the amount of change calculated at step S19 is greater than the threshold (No at step S20), the sample data discard unit 11 determines whether cluster center recalculation has been performed for all the sample data portions that are data-discard candidates (step S22). Note that recalculation of the cluster centers refers to the process at step S18 described above. If the cluster center recalculation has been performed for all the discard candidate points, i.e., all the sample data portions that are data-discard candidates (Yes at step S22), the process proceeds to step S11. If there is a sample data portion for which the cluster center is not yet calculated among the data-discard candidates (No at step S22), the sample data discard unit 11 increments the parameter i as i=i+1 (step S23), and the process then returns to step S17.

As described above, the interference identification device 10*a* of the present embodiment causes the sample data discard unit 11 to select and discard a sample data portion so that the cluster center will remain the same for the cluster corresponding to newly measured electromagnetic environmental data. This has an effect of preventing an increase in the amount of sample data, thereby preventing, in the process thereafter, the process from decelerating, that is, the processing load from increasing, for identification of the type of an interference signal. Selection and discarding of a sample data portion to be discarded so that the cluster center will remain the same enables the accuracy of clustering to be maintained also after discarding of the sample data portion.

The configurations described in the foregoing embodiments are merely examples of various aspects of the present invention. These configurations may be combined with a known other technology, and moreover, a part of such configurations may be omitted and/or modified without departing from the spirit of the present invention.

REFERENCE SIGNS LIST

1 antenna; 2 RF processing unit; 3 A/D converter unit; 4 feature calculation unit; 5 distance-to-cluster calculation unit; 6 sample data analysis length update unit (analysis length update unit); 7 interference identification unit; 8 memory unit; 9 output unit; 10, 10*a* interference identification device; 11 sample data discard unit.

The invention claimed is:

1. An interference identification device comprising:

a processing circuit to calculate, using an electromagnetic wave received during an analysis time length, at least one type of feature of the electromagnetic wave;

to identify a cluster to which the at least one type of feature belongs, among a plurality of clusters, each of the multiple clusters a region defined in a cluster space having one or more dimensions in which one type of feature corresponds to one dimension; and to update the analysis time length based on a distance, in the cluster space, between the at least one type of feature and one of the clusters to which the at least one type of feature belongs.

2. The interference identification device according to claim 1, comprising:

a receiving device to receive the electromagnetic wave; and to amplify the electromagnetic wave received.

3. The interference identification device according to claim 1, wherein the processing circuit stores an identification result by the identification, the at least one type of feature, and the analysis time length, in association with one another.

4. The interference identification device according to claim 1, wherein each of the regions of the plurality of clusters in the cluster space is defined by a cluster center that is a center of each of the plurality of clusters, and by a cluster radius that is a radius of each of the plurality of clusters, the—processing circuit further calculates, for each of the plurality of clusters, a distance between the at least one type of feature and the cluster center, selects one of the clusters corresponding to a shortest distance of the distances calculated, and calculates a difference resulting from subtraction of the cluster radius from the distance of the cluster selected, and the processing circuit updates the analysis time length based on the difference.

5. The interference identification device according to claim 4, the processing circuit selects, based on a distance in the cluster space between a first feature that is one of the at least one type of feature newly calculated, and a second feature that is previously calculated one of the at least one type of feature belonging to the cluster to which the first feature belongs, the second feature to be discarded, and to discards the second feature selected, wherein the cluster center and the cluster radius are calculated based on the at least one type of feature belonging to the cluster corresponding to the cluster center and to the cluster radius.

6. The interference identification device according to claim 5, wherein the processing circuit discards the second feature in a case in which, in the cluster to which the first feature belongs, a distance between the cluster center calculated with the second feature selected and the cluster center calculated without the second feature selected is less than or equal to a threshold.

7. The interference identification device according to claim 2, wherein the processing circuit stores an identification result by the identification, the at least one type of feature, and the analysis time length, in association with one another.

8. An interference identification method comprising:

a first step, performed by an interference identification device, of calculating, using an electromagnetic wave received during an analysis time length, at least one type of feature of the electromagnetic wave:

a second step, performed by the interference identification device, of identifying a cluster to which the at least one type of feature belongs, among a plurality of clusters, each of the plurality of clusters having a region defined in a cluster space having one or more dimensions in which one type of feature corresponds to one dimension; and a third step, performed by the interference identification device, of updating the analysis time length based on a distance, in the cluster space, between the at least one type of feature and one of the clusters to which the at least one type of feature belongs.

9. An interference identification device comprising:

a processor to execute a program; and a memory to store the program which, when executed by the processor, performs processes of, calculating, using an electromagnetic wave received during an analysis time length, at least one type of feature of the electromagnetic wave;

identifying a cluster to which the at least one type of feature belongs, among a plurality of clusters, each of the multiple clusters having a region defined in a cluster space having one or more dimensions in which one type of feature corresponds to one dimension; and updating the analysis time length based on a distance, in the cluster space, between the at least one type of feature and one of the clusters to which the at least one type of feature belongs.

10. The interference identification device according to claim 9, comprising:

a receiving device to receive the electromagnetic wave; and to amplify the electromagnetic wave received.

11. The interference identification device according to claim 9, wherein the memory stores an identification result by the identification, the at least one type of feature, and the analysis time length, in association with one another.

12. The interference identification device according to claim 10, wherein the memory stores an identification result by the identification, the at least one type of feature, and the analysis time length, in association with one another.

13. The interference identification device according to claim 9, wherein each of the regions of the plurality of clusters in the cluster space is defined by a cluster center that is a center of each of the plurality of clusters, and by a cluster radius that is a radius of each of the plurality of clusters, the processor further calculates, for each of the plurality of clusters, a distance between the at least one type of feature and the cluster center, selects one of the clusters corresponding to a shortest distance of the distances calculated, and calculate a difference resulting from subtraction of the cluster radius from the distance of the cluster selected, and the processor updates the analysis time length based on the difference.

* * * * *